Aug. 7, 1951 A. RAPPL ET AL 2,563,068
WINDSHIELD CLEANER
Filed Jan. 29, 1945 2 Sheets-Sheet 1

INVENTORS
Anton Rappl + Martin Bitzer
BY
Beau, Brooks, Buckley + Bean. ATTORNEYS Aug. 7, 1951  A. RAPPL ET AL  2,563,068
WINDSHIELD CLEANER
Filed Jan. 29, 1945  2 Sheets-Sheet 2
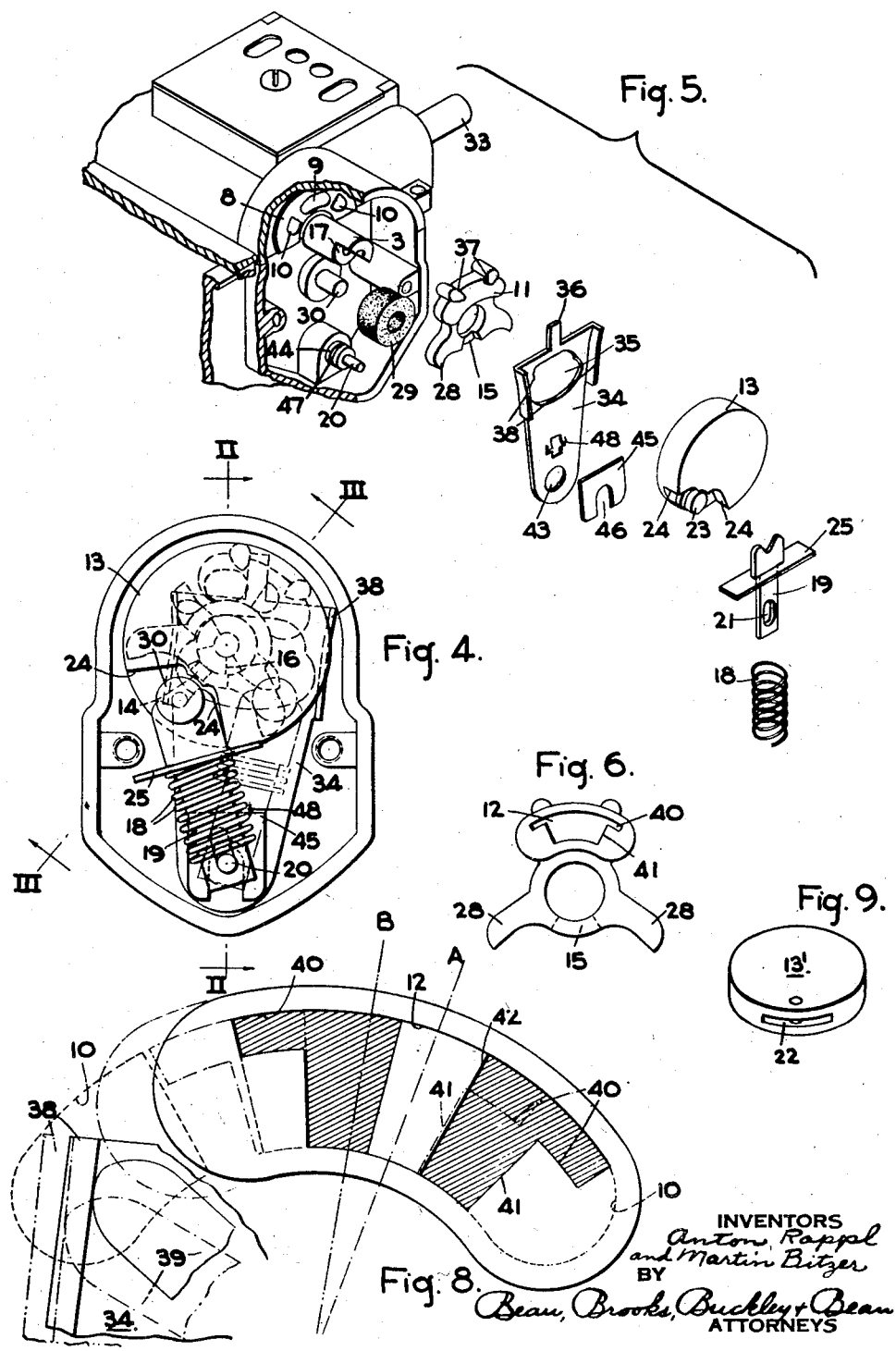
INVENTORS
Anton Rappl
and Martin Bitzer
BY
Beau, Brooks, Buckley + Bean
ATTORNEYS Patented Aug. 7, 1951

2,563,068

UNITED STATES PATENT OFFICE 2,563,068

WINDSHIELD CLEANER

Anton Rappl, Eggertsville, and Martin Bitzer, Kenmore, N. Y., assignors to Trico Products Corporation, Buffalo, N. Y.

Application January 29, 1945, Serial No. 575,070

31 Claims. (Cl. 15—253)

This application relates to the windshield cleaning art and especially to the oscillatory or reciprocatory type of wiper operation wherein the wiper is movable back and forth in a definite path on the windshield surface for maintaining a clear field of vision. In the windshield cleaner much used on the present day motor vehicle, a fluid motor is provided for oscillating the wiper back and forth. At the end of the stroke the wiper will tend to overtravel its prescribed path and at high speeds of operation an overtravel will develop which causes the wiper to strike against the windshield molding or frame with the result that an objectionable noise is produced and the finish of the car is marred.

The object of the present invention is to provide a windshield cleaner in which the stroke of the wiper is controlled against becoming excessive or objectionable. According to the present invention this is accomplished by automatically throttling the power supplied the motor as the wiper approaches the end of its stroke with a resultant retarding effect on the wiper against over-travel.

The invention further has for its object to provide a motor of this character which is especially adapted for use as an accessory on motor vehicle power plants of the internal combustion type wherein the available supply of suction for operating the accessory fluctuates incidental to changes in operating conditions in the power plant.

In the drawings:

Fig. 4 is a front elevation of the reversing valve mechanism, the cover of the chamber being removed.

Fig. 5 is an exploded view showing the several parts of the reversing valve mechanism.

Fig. 6 is a detailed view of the valve member.

Fig. 8 is a diagrammatic showing more clearly depicting the automatic throttling action; and Fig. 9 is a detailed view of a modified valve kicker.

Figure 1:
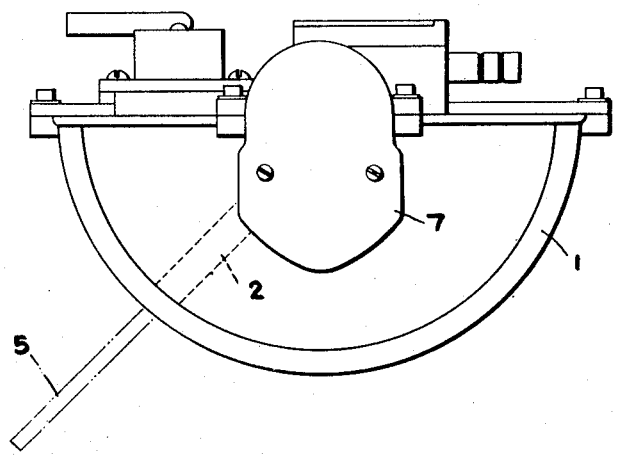
Fig. 1 is an elevation of a windshield cleaner embodying the present invention.

Referring more particularly to the drawing, the numeral 1 designates a windshield cleaner motor having an arcuate chamber in which oscillates a vane type piston 2 that is fixed to the shaft 3, the latter being journaled in suitable bearings 4 in the motor housing and extending at one end to support a wiping blade 5 for oscillating the same on the windshield surface. The opposite end of the shaft is extended into a valve chamber 6 which is normally closed by a cover plate 7 and in which is arranged the automatic reversing valve mechanism now to be described.

On a valve seat 8, having a central pressure or suction supply port 9 between two chamber ports 10 leading to the motor chamber at opposite sides of the vane type piston 2, is an oscillatable valve 11, the latter having its seat engaging face formed with a port bridging recess 12 adapted to connect the pressure supply port 9 with one or the other of the two chamber ports 10 when disposed in one or the other of its two operative positions. A kicker member 13 has a laterally extending lug 14 engaged in a recess 15 of the valve member 11 for limited play between the opposing shoulders as provided by the ends of the recess, the play being sufficient to provide a preliminary idle movement of the kicker before imparting movement to the valve. The kicker in turn is provided with a pair of shoulders 16 adapted to be engaged by a pair of shoulders 17 on the motor shaft 3. A snap-over spring device embodying a compression coil spring 18 and a supporting guide stem 19 is utilized to impart a quick valve shifting movement to the kicker 13 after the latter has been moved by one of the shaft shoulders 17 to a position slightly beyond a dead center position with respect to the spring device and its mounting pin 20, the guide stem 19 having both slidable and pivotal movement on the pin by means of the slot 21 in one end portion of the stem. The opposite end portion of the stem is received within a seat or groove 22 in the kicker, Fig. 9, or within a seat or groove in a stud 23 on the kicker, Fig. 5, for pivoting upon a bearing in the groove. The kicker is preferably in the form of a weighted disc with a recess receiving the stud 23. This recess, as well as the groove 22, provides emergency stop shoulders 24 with which the guide stem may engage to limit the extent of kicker movement as it shifts the valve to its new position, but normally the kicker is arrested by a light flat spring 25 which is carried fixedly by the guide stem. The flat spring extends in opposite directions to provide resilient braking portions or shoes for alternately engaging the periphery of the disc shaped kicker to thereby properly poise the spring device with respect to the kicker. Preferably this braking action will be sufficient to arrest the kicker motion before the stem contacts the obstructing shoulder 24, the latter functioning only upon failure of the flat spring in this respect.

From the foregoing it will be apparent that as the fluid pressure differential moves the vane-like piston in one direction or the other that the rock shaft 3, at a predetermined point in the cycle of operation, will absorb the play between the shoulders 16 and 17 and thereafter carry the kicker along with the valve 11 beyond the position of maximum distortion or compression of the spring 18 whereupon the latter will actuate the kicker and shift the valve 11 to its other position. The valve has spaced stop shoulders 28 alternately engageable with a cushioning ring of felt 29 on a stud 30 to arrest it in one valving position or the other under the urge of the spring 18. The valve 11 is herein depicted as being pivotally mounted on the motor shaft 3, the latter having an axial recess 31 to receive a pintle 32 on the kicker for pivotally mounting the latter.

Means are provided for throttling the effective port capacity of the fluid motor, the port 9 opening into the nipple 33 which forms a part of the pressure supply line leading to a source of suction, or it may be super-atmospheric. According to the illustrated embodiment the valve member 11 is initially shifted to a limited extent, and prior to the functioning of the kicker 13 as aforesaid, for reducing the overlap of the valve recess 12 with respect to the connected one of the two chamber ports 10. By this preliminary but incomplete valve movement the capacity of the pressure communication between the motor chamber and the pressure source will be throttled or restricted and the speed of the motor will be reduced, the terms "throttle" and "restricted" herein meaning a partial closing of the port passage short of a full closure thereof.

For effecting this initial or throttling shift of the valve member 11, a valve throttler or shifter 34 is herein depicted in the form of a lever and is pivotally mounted on the pin 20. It has a terminal finger 36 extending between spaced shoulders 37 on the valve member for alternate contact therewith, sufficient play being provided to permit the spring imparted movement of the valve when the kicker functions. The valve shifter 34 has an opening 35 through which the motor shaft extends and is provided with opposed shoulders 38 at opposite sides thereof for alternate engagement by camming lugs 39 on the kicker, the arrangement being such that when the motor shaft 3 begins to drive the kicker, these lugs 39 will cam upon the shoulders 38 and swing the valve shifter a limited extent sufficient to shift the valve to its port throttling position. This occurs toward the end of each motor stroke with the result that during the remaining portion of the motor stroke there will be a retarding action to offset or counteract to a large degree the over-riding tendency of the wiper carrying arm when the reversing valve acts in its primary capacity.

In order to control the throttling action more definitely the contour of the overlapping portions of the recess 12 and the chamber ports 10 may be shaped for more accurately determining the throttling effect. In the illustrated embodiment, the recess 12 is so shaped the same having terminal restrictions 40 extending outwardly from the radial end walls 41, the latter being designed to overlie a radial wall 42 at the inner side of each chamber port 10 and thereby very decidedly and abruptly reduce the effective capacity of the pressure supplying passage for retarding the terminal portion of the motor stroke. This is diagrammatically illustrated in Fig. 8, wherein the reversing valve is depicted by solid lines in the position of Fig. 4, with the running ports operating at full capacity. When the lug 39 comes into action it will move the shifter 34 to the broken line position wherein the right hand extension 40 will define with the wall 42 of the adjacent chamber port 10 a much restricted port opening for throttling the fluid flow therethrough. The extent of the valve throttling movement is indicated by the two center lines A and B.

Figure 2:
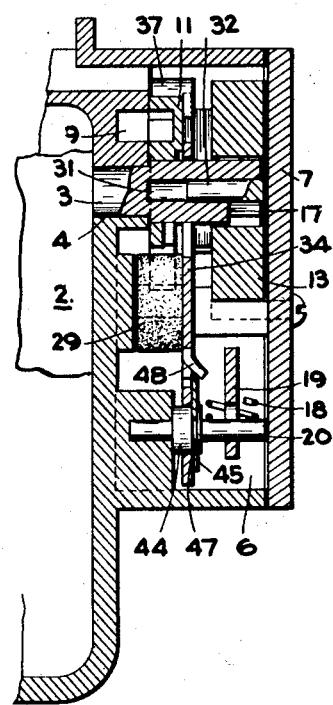
Fig. 2 is a fragmentary sectional view about on line 2—2 of Fig. 4 through the reversing valve mechanism.
Figure 7:
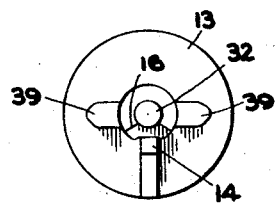
Fig. 7 is a similar view of the valve kicker.
Figure 3:
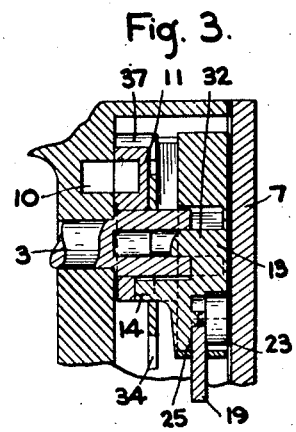
Fig. 3 is a similar fragmentary view about on line 3—3 of Fig. 4 showing the parts thereof about on a dead center position.

The throttling shifter is provided with an opening 43 for fulcrum support on an enlarged hub 44 on the pin 20 and is secured in its position by a retaining spring plate 45 having a slot 46 adapted to interlock in a groove 47 in the hub. The shifter is provided with a shoulder 48 designed to overhang the back edge of the retainer 45 to secure it in place, as shown more clearly in Fig. 2.

From the foregoing it will be observed that as the piston 2 is reciprocated back and forth in response to reversals in the pressure differential as occasioned by the automatic valve mechanism, the wiper movement will be retarded toward the end of its stroke and thereby minimize any tendency to overtravel its predetermined path. The retarding action is cushioned by reason of the operating fluid, the air serving in the capacity of a cushion during the retarded portion of each stroke. The wiper movement is thereby kept within due bounds and any over-riding tendency is controlled to a practical extent.

It will be understood that the mechanism described and shown herein is merely illustrative of the inventive principles involved, which may be applied to other physical embodiments without departing from the scope and spirit of the invention claimed.

What is claimed is:

1. A valve action for a windshield cleaner having a fluid motor with a chamber with a piston part therein operable back and forth as the fluid pressure is operatively applied through chamber port means by an automatic valve mechanism, comprising, in combination with the valve of the mechanism movable back and forth between two operative positions, means responsive to the motor operation for throttling the port means by the shifting of the valve of the automatic valve mechanism previous to the functioning of the mechanism thereby to retard the motor operation against overtravel of the piston part at the time of reversing the pressure application thereto.

2. A fluid motor having valve means shiftable back and forth between two positions for operatively applying fluid pressure through chamber port means to reciprocate a pressure responsive part in the motor chamber, spring actuated kicker means movable back and forth by said part across a point of maximum spring distortion for shifting said valve means, and means operable by and during motor operation for preliminarily moving said valve means to a port throttling position thereby to retard said pressure responsive part against substantial overtravel when said kicker means subsequently reverses the application of pressure.

3. A fluid motor having valve means shiftable back and forth between two positions for operatively applying fluid pressure through chamber port means to reciprocate a pressure responsive part in the motor chamber, spring actuated kicker means movable back and forth by said part across a point of maximum spring distortion for shifting said valve means, and means operable by and during motor operation for preliminarily moving said valve means to a port throttling position thereby to retard said pressure responsive part against substantial overtravel when said kicker means subsequently reverses the application of pressure, said throttling means being operable by said kicker means as the latter approaches its point of maximum spring distortion.

4. A fluid motor having a valve action comprising valve means movable back and forth between two positions wherein chamber port means are fully opened for fluid communication, means operable automatically to shift the valve means from one to the other of said positions for reversing the pressure differential in the motor, and means functioning preliminary to the shifting of the valve means for adjusting the latter to a position wherein the chamber port means are partially closed to retard the motor operation against substantial overtravel when the pressure differential is reversed.

5. A fluid motor having an oscillatory shaft, valve means shiftable back and forth between two operative positions wherein unrestricted communication through chamber port means is had, a spring actuated kicker having a play connection with the valve means for so shifting the latter following a delayed shaft imparted movement of the kicker beyond a position of maximum spring distortion, and means operable by the shaft imparted movement of the kicker for adjusting the valve means to a port restricting position for retarding the motor against substantial overtravel at the end of its stroke.

6. A fluid motor having an oscillatory shaft, valve means shiftable back and forth between two operative positions wherein unrestricted communication through chamber port means is had, a spring actuated kicker having a play connection with the valve means for so shifting the latter following a delayed shaft imparted movement of the kicker beyond a position of maximum spring distortion, means operable by and during the initial portion of such kicker movement for adjusting the valve means to a port restricting position, and means on the kicker for so operating said adjusting means.

7. A reciprocable motor having a valve seat with a pressure supply port and a chamber port, a valve movable back and forth on the seat between two positions and having a passage for connecting the two ports when in one position, means operable by the motor to so move the valve for determining the stroke of the motor, and means operable by the motor to preliminarily shift the valve short of its full movement to modify the effective capacity of the chamber port for retarding the motor speed prior to such stroke determining movement of the valve.

8. A valve for automatic fluid motor mechanism, comprising a body having a mounting bearing and a seat engaging face with a port bridging passage, said body having oscillation limiting means, kicker engaging means, and throttler engaging means.

9. A throttler for shifting the valve element of automatic fluid motor mechanism, comprising a lever having a fulcrum part at one end, a valve engaging part at its outer end and an intermediate kicker engaging part.

10. A kicker for automatic fluid motor mechanism, comprising a weighted disc having a peripheral braking surface, an adjacent stem receiving seat, and a pair of throttler cam engaging lugs with an intermediate shaft shifting lug.

11. A fluid motor having an oscillatory shaft and a concentric valve seat with a pressure supply port between two chamber ports, a valve pivoting on the shaft between two operative positions and having a port bridging recess to connect the supply port alternately to the chamber ports, a spring actuated valve moving kicker operable by the shaft and having a play connection with the valve enabling the latter to be shifted when in one of its two positions for throttling the effective capacity of one of the connected ports for retarding the motor speed prior to a subsequent kicker imparted shifting movement of the valve to its other position, and motor actuated means operable to so shift the valve for throttling the motor.

12. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter having connection with the valve to shift it on its seat while still in one operative position to modify the effective port capacity of one of the bridged ports, and a spring actuated kicker operable from the shaft and operative to initially actuate the shifter and then move the valve to its other position.

13. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter having connection with the valve to shift it on its seat while still in one operative position to modify the effective port capacity of one of the bridged ports, a spring actuated kicker operable from the shaft and operative to initially actuate the shifter and then move the valve to its other position, and means operable by the kicker during its valve moving action to arrest the valve in such other position.

14. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter having connection with the valve to shift it on its seat while still in one operative position to modify the effective port capacity of one of the bridged ports, and a spring actuated kicker operable from the shaft and operative to initially actuate the shifter and then move the valve to its other position, the port bridging recess of the valve having terminal restrictions serving alone to maintain the throttling communication after the shifter has so functioned.

15. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter pivotally mounted on the motor to one side of the shaft and straddling the latter, a part on the shifter having a play connection with the valve to shift the latter while in one operative position to restrict the effective capacity of the connected ports, and a spring actuated valve moving kicker operable by the shaft to initially actuate the shifter and then move the valve to its other position.

16. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter pivotally mounted on the motor to one side of the shaft and straddling the latter, a part on the shifter having a play connection with the valve to shift the latter while in one operative position to restrict the effective capacity of the connected ports, a kicker pivoted on the shaft and having operative connection with the valve to move it to its other position, said kicker having means for camming upon the shifter to actuate the latter prior to moving the valve, and spring means for actuating the kicker.

17. A fluid motor having an oscillatory shaft and a concentric valve seat with a pressure supply port between two chamber ports, a valve pivoting on the shaft between two operative positions and having a port bridging recess to connect the supply port alternately to the chamber ports, a throttling shifter pivotally mounted on the motor to one side of the shaft and straddling the latter, a part on the shifter having a play connection with the valve to shift the latter while in one operative position to restrict the effective capacity of the connected ports, a kicker pivoted on the shaft and having operative connection with the valve to move it to its other position, said kicker having means for camming upon the shifter to actuate the latter prior to moving the valve, a spring device fastened at one end on the motor and having its opposite end connected to the kicker for stressing the same for subsequently actuating the kicker during its valve moving cycle, and kicker braking means carried by said spring device and operable during the latter portion of such cycle to arrest the kicker and its connected valve whereby to locate the latter definitely with respect to the throttling shifter.

18. A snap action for a valve, comprising a kicker pivoted for back and forth movement, a spring device pivotally mounted to one side of the pivot axis of the kicker and connected to the latter for driving the kicker in a valve actuating manner after rocking through a position of maximum spring distortion, said kicker having a brake engaging surface extending in opposite directions from the point of spring attachment thereto, and a brake carried by the spring device and having oppositely extending brake portions alternately engageable with the brake surface by and upon the rocking of the device during its kicker driving action.

19. A snap action for a valve, comprising a kicker pivoted for back and forth movement, a spring device pivotally mounted to one side of the pivot axis of the kicker and connected to the latter for driving the kicker in a valve actuating manner after rocking through a position of maximum spring distortion, said kicker having a brake engaging surface extending in opposite directions from the point of spring attachment thereto, a brake carried by the spring device and having oppositely extending brake portions alternately engageable with the brake surface by and upon the rocking of the device during its kicker driving action for arresting the kicker, and means on the kicker cooperating with said spring device to limit the pivotal movements of both upon the failure of the brake portions to arrest the kicker.

20. A windshield cleaner comprising a wiper, a motor connected to the wiper and having a part movable back and forth by a reversal in the application of power at the end of each stroke whereby to terminate the movement of the wiper in one direction and start it on its next stroke upon overcoming the inertia in the moving wiper, and means for reducing the applied power as the wiper approaches the end of its stroke thereby to reduce the inertia to be overcome at the end of the stroke.

21. A windshield cleaner comprising a wiper, a motor having a part operable back and forth by fluid pressure reversely applied at the end of each stroke whereby to reverse the movement of the wiper upon overcoming the inertia in the moving wiper at the end of the preceding stroke, and means operable by the motor for reducing the application of power to said motor part as the latter approaches the end of its stroke to reduce the inertia in the wiper at the time of reversal and thereby minimize its overtravel at the end of the stroke.

22. A windshield cleaner comprising a wiper, a motor having an oscillatory shaft imparting back and forth strokes thereto and including means for reversing the application of power to a reciprocatory motor part to reverse the direction of travel of the latter when the inertia of the moving wiper has been overcome, and means operable by the motor preliminary to the reversal of power application for reducing though maintaining a predetermined restriction in the application of power to said part throughout the remainder of each stroke to insure the completion of the stroke but modified to reduce the inertia in the moving wiper for minimizing its overtravel at the end of its stroke.

23. A windshield cleaner comprising a wiper, a motor having a movable wall connected to oscillate a wiper carrying shaft for imparting back and forth strokes to the wiper, valve means operable by the shaft for automatically reversing the application of an operating pressure differential upon the movable wall to reverse the direction of travel of the latter when the inertia of the moving wiper has been overcome, and throttling means operable by the movable wall ahead of the automatic reversing means for reducing the pressure differential acting on the wall to a predetermined volume for a predetermined time interval toward the end of the strokes to reduce the power input and thereby retard the moving wiper for reversal to minimize the tendency of the wiper to overtravel.

24. A windshield cleaner comprising a wiper, a fluid motor having a wiper actuating rock shaft with a vane-like piston fixed thereon to operate in the motor chamber, valve means responsive to the oscillations of the rock shaft for reversing the operating pressure differential upon the piston automatically to reverse the direction of travel of the latter when the inertia of the moving wiper has been overcome, and other means operable by the rock shaft preliminary to the shaft actuation of said valve means to preset the latter for throttling the pressure supply communication toward the end of the wiper stroke thereby to reduce the power input and the inertia in the moving wiper while continuing movement of the latter to the end of its stroke.

25. A windshield cleaner comprising a wiper, a fluid motor having a wiper actuating rock shaft with a vane-like piston fixed thereon to operate in the motor chamber, automatic valve mechanism for reversing the application of fluid pressure to the piston to reverse the direction of travel of the latter when the inertia of the moving wiper has been overcome, said mechanism including a seat having a chamber port, a valve operating on the seat between two positions to open one chamber port and to close the other chamber port alternately for motor operation, with motor responsive means to shift the valve from one to the other of its two positions, and other means responsive to the motor operation for presetting the valve to a port throttling position to reduce but maintain a restricted power input into the shaft prior to the functioning of the first motor responsive means thereby to reduce the inertia in the moving wiper prior to its reversal as effected by such functioning of the first motor responsive means.

26. A fluid motor having a chamber with a piston therein and a valve seat with chamber ports each communicating with the chamber at a respective side of the piston, mechanism having a valve movable back and forth on the seat between two operative positions and in so moving serving to open one port and to close the other, with means responsive to the motor operation for so moving the valve, and motor responsive means operable previously to the functioning of said valve moving means to initially preset said valve for partially closing the open port for a predetermined period to retard the motor operation, said valve moving means thereafter acting upon said valve to move it from its preset position to fully close such port and then to open the previously closed port for reversing the direction of travel of the piston.

27. A snap action comprising a power switching member movable back and forth between two operative positions through an intermediate power modifying position, a kicker connected to the member for so moving it from the intermediate position, spring means pivotally supported at one end and having its opposite end pivotally connected to the kicker, power actuated means operable to move the spring means back and forth through a position of maximum spring distortion in the plane of the pivot axes for the kicker and the spring means to actuate the kicker, and other power actuated means operable preliminarily with respect to the kicker actuation to preset the power switching member to its intermediate power modifying position for modifying the power application preliminary to switching the power.

28. A windshield cleaner comprising a fluid actuated motor having an oscillatory shaft and automatic valve mechanism for operatively applying fluid pressure first in one direction and then in the reverse to oscillate the shaft, a wiper connected to the shaft for being oscillated thereby, and pressure restricting means operable by the motor preliminary to pressure reversal for momentarily restricting the fluid admission to the motor and maintaining such restricted communication throughout the remainder of the motor stroke for retarding the wiper motion.

29. A windshield cleaner comprising a wiper, a motor having a movable wall connected to oscillate a wiper carrying shaft for imparting back and forth strokes to the wiper, and valve means automatically reversing the application of an operating pressure differential to the movable wall and including means responsive to the movement of the latter for reducing the pressure differential toward the end of the strokes to retard the speed of the wiper and thereby minimize the tendency of the latter to overtravel when the power is reversed.

30. A windshield cleaner comprising a wiper, a fluid motor having a wiper carrying rock shaft with a vane-like piston fixed thereon to operate in the motor chamber, valve means responsive to the oscillations of the rock shaft for reversing the operating pressure differential upon the piston automatically, and other means responsive to the movement of the rock shaft for throttling the pressure supply communication toward the end of the wiper stroke thereby to retard the wiper movement against overtravel at the time of pressure reversal.

31. A windshield cleaner comprising a wiper, a fluid motor having a wiper carrying rock shaft with a vane-like piston fixed thereon to operate in the motor chamber, automatic valve mechanism for reversing the application of fluid pressure to the piston, said mechanism including a seat having a chamber port, a valve operating on the seat between two positions to open and close the port for motor operation, with the motor responsive means to shift the valve from one to the other of its two positions, and other means responsive to the motor operation for initially shifting the valve to a port throttling position prior to the functioning of the first motor responsive means thereby to retard the wiper movement prior to the reversal of the wiper as effected by such functioning of the first motor responsive means.

ANTON RAPPL.
MARTIN BITZER.

REFERENCES CITED

The following references are of record in the file of this patent:

UNITED STATES PATENTS

| Number | Name | Date |
|---|---|---|
| 1,717,700 | Lippert | June 18, 1929 |
| 1,835,982 | Hammerly | Dec. 8, 1931 |
| 2,118,792 | Horton | May 24, 1938 |
| 2,160,920 | Strawn | June 6, 1939 |
| 2,223,792 | Muir | Dec. 30, 1940 |
| 2,338,690 | Timm | Jan. 4, 1944 |
| 2,363,621 | Rappl | Nov. 28, 1944 |
| 2,366,777 | Farley et al. | Jan. 9, 1945 |